Dec. 9, 1952  R. J. TURPIN  2,621,005
VIBRATION CONTROL UNIT FOR PIPING AND THE LIKE
Filed Oct. 1, 1948
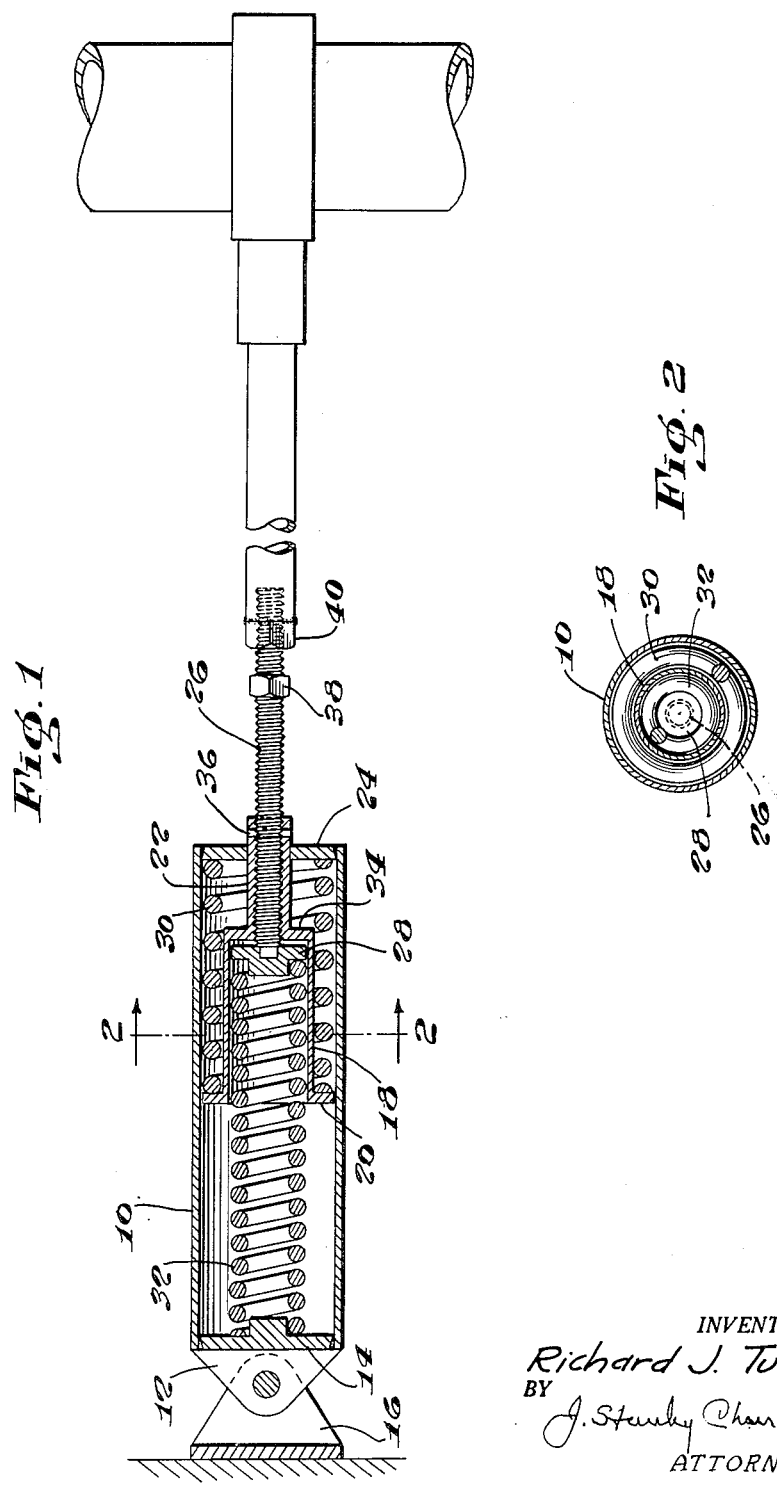
INVENTOR.
Richard J. Turpin
BY
J. Stanley Churchill
ATTORNEY Patented Dec. 9, 1952

2,621,005

UNITED STATES PATENT OFFICE 2,621,005

VIBRATION CONTROL UNIT FOR PIPING AND THE LIKE

Richard J. Turpin, Winthrop, Mass., assignor to Carpenter and Paterson Inc., Boston, Mass., a corporation of Massachusetts Application October 1, 1948, Serial No. 52,220

6 Claims. (Cl. 248—54)

This invention relates to a vibration control unit for piping and the like.

The invention has for an object to provide a novel and improved vibration control unit particularly adapted for use in checking or damping vibrations in pipe lines caused by temperature variations, mechanical oscillation or the like, and characterized by novel structure capable of adjustment to obtain the desired resistance to vibration in a simple and efficient manner.

With this general object in view, and such others as may hereinafter appear, the invention consists in the vibration control unit hereinafter described and particularly defined in the claims at the end of this specification.

In the drawings illustrating the preferred embodiment of the invention, Fig. 1 is a longitudinal cross sectional view of a vibration control unit embodying the present invention; and Fig. 2 is a cross-section taken on the line 2—2 of Fig. 1.

In general, the present invention contemplates a vibration control unit adapted for connection between a fixed member, usually a part of the building, and the part subjected to vibratory influences. The control unit is designed to provide a simple and effective means for reducing the vibratory movement to a minimum. The illustrated vibration control unit includes an element adapted to be connected to a fixed support, a cooperating extensible element adapted to be connected to the vibratory member, and a shock absorbing connection comprising opposed coil springs cooperating with said elements and arranged to resist the vibratory movement, provision being made for adjusting the springs to obtain the desired initial resistance by means of an elongated threaded member operatively connected to the vibratory member and forming a part of the extensible element.

Referring now to the drawings, the present vibration control unit is illustrated as embodied in a piping system for controlling the vibratory movement of a pipe section and in which 10 represents an elongated cylindrical casing having an extension 12 formed integrally with an end wall 14 of the casing and adapted for pivotal connection to an angle bracket 16 attached to a fixed member such as the wall or ceiling. The extensible portion of the unit includes a hollow cup-shaped cylindrical member 18 disposed within and movable longitudinally of the casing, the member 18 having an outwardly extended flange 20 at one end, and a reduced diameter portion 22 at its other end extended through and slidingly fitted in an opening in the end wall 24 of the casing 10. The extended portion 22 is provided with a central threaded portion arranged to receive an elongated threaded rod 26 having provision at one end for connection to a pipe clamp or other connecting member attached to the vibratory element, and having its other end extended through the portion 22 and into the hollow portion of the member 18, the inner end of the rod being provided with a flanged spring cap or spring end bearing member 28. Opposing coil springs 30, 32 are arranged to bear against the extensible unit and, as herein shown, the spring 30 is interposed between the end wall 24 of the casing and the underside of the flange 20, and a spring 32 of smaller diameter but preferably of the same solid load and deflection characteristics as the spring 30, is interposed between the opposing end wall 14 of the casing and the spring cap 28 attached to the inner end of the rod 26.

With this construction it will be seen that the springs 30, 32 exert pressure in opposite directions against the extensible unit attached to the vibratory member and that rotation of the threaded rod 26 in one direction will effect compression of the springs, increasing the distance or spacing between the spring cap 28 and the intermediate wall 34 of the cup-shaped member 18, and, rotation of the rod in the opposite direction will effect extension of the springs to obtain the desired degree of pressure in opposition to any vibratory movement set up in the pipe section. In practice, the unit may be adjusted to exert the desired initial resistance to the vibratory movement and may then be locked in its adjusted position by a pin 36 extended transversely through the lower end of the portion 22 and the threaded rod 26. The rod 26 may be further provided with a square or hexagonal portion 38 for convenience in adjusting the unit, and with a nut 40 for attachment to the pipe clamp extension upon installation of the unit. For convenience in initially adjusting the unit, the extension 22 may be provided with graduations denoting the load on the springs in pounds per inch.

From the above description it will be seen that the present vibratory control unit provides a simple and effective means for dampening vibrations that may be set up in the pipe lines, and further embodies novel adjusting means to effect simultaneous compression or extension of the opposed springs to obtain the desired initial resistance to movement of the vibratory member in either direction.

While the preferred embodiment of the invention has been herein illustrated and described, it will be understood that the invention may be embodied in other forms within the scope of the following claims.

Having thus described the invention what is claimed is:

1. A vibration control unit comprising an elongated casing having end walls adapted for connection to a fixed support at one end thereof, an extensible member disposed within the casing and having a portion extended through an end wall of the casing and being adapted for connection to a vibratory member, shock absorbing means within the casing comprising two opposed springs engageable with the end walls of the casing and with different and relatively movable portions of said extensible member arranged to restrain the movement of said vibratory member in both directions, and means for simultaneously adjusting the initial compression of each of said springs including an elongated threaded rod operatively connected to and forming a part of said extensible member and adapted when rotated to effect simultaneous relative movement of said different portions of the extensible member.

2. A vibration control unit comprising a cylindrical casing having end walls and having provision for connection to a fixed member at one end thereof, an extensible member disposed within the casing and having a portion extended through an end wall adapted for connection to a vibratory member, shock absorbing means comprising two opposed springs engageable with the end walls of the casing and with different and relatively movable portions of said extensible member arranged to restrain the movement of said vibratory member in both directions, and means for simultaneously adjusting the initial compression of said springs including an elongated threaded rod operatively connected to and forming a part of said extensible member and adapted when rotated to effect simultaneous relative movement of said different portions of the extensible member, said opposed springs having equal load and deflection characteristics.

3. A vibration control unit comprising a cylindrical casing having end walls and being adapted for connection to a fixed member at one end, an extensible member disposed within the casing comprising a cup-shaped element having an outwardly extended flange at one end and having a reduced diameter portion at its other end, said member being slidably extended through an opening in an end wall, an elongated threaded rod extending in threaded engagement through said reduced diameter portion and having a spring cap at its inner end and adapted for connection to a vibratory member at its other end, and shock absorbing means including a spring interposed between an end wall and the underside of said flange, and a second spring interposed between the opposing end wall and said spring cap, whereby upon rotation of said threaded rod simultaneous compression or extension of said opposed springs may be effected.

4. A vibration control unit comprising a cylindrical casing having end walls and being adapted for connection to a fixed point at one end, an extensible member disposed within the casing comprising a cup-shaped element having an outwardly extended flange at one end and having a reduced diameter portion at its other end and being slidably extended through an opening in an end wall, an elongated threaded rod extending in threaded engagement through said reduced diameter portion having a spring cap at its inner end and adapted for connection to a vibratory member at its other end, and shock absorbing means including a spring interposed between an end wall and the underside of said flange, and a second spring interposed between the opposing end wall and said spring cap, whereby upon rotation of said threaded rod simultaneous compression or extension of said opposed springs may be obtained, said opposed springs having equal load and deflection characteristics.

5. A vibration control unit comprising a cylindrical casing having end walls and being adapted for connection to a fixed point at one end, an extensible member disposed within the casing having a portion slidably extended through an end wall and adapted for connection with a vibratory member, shock absorbing means comprising two opposed springs engageable with the end walls of the casing and different and relatively movable portions of said extensible member arranged to restrain the movement of said vibratory member in either direction, means for simultaneously adjusting the initial compression of said springs including an elongated threaded rod operatively connected to said different portions and forming a part of said extensible member, and means for securing said threaded rod in its adjusted position, said last-named means including a pin extended through said slidably extended portion and said threaded rod.

6. A vibration control unit of the character described comprising a fixed member, a cooperating extensible member having different and relatively movable portions, opposing springs extended between portions of said fixed member and said extensible member, and a single adjusting member operatively connected to the different and relatively movable portion of said extensible member including a threaded rod adapted to effect simultaneous compression of said opposed springs to adjust said springs to the initial load required to resist vibratory movement in either direction.

RICHARD J. TURPIN.

REFERENCES CITED

The following references are of record in the file of this patent:

UNITED STATES PATENTS

| Number | Name | Date |
|---|---|---|
| 1,087,519 | White | Feb. 17, 1914 |
| 1,350,056 | Barry | Aug. 17, 1920 |
| 1,703,397 | Kirk et al. | Feb. 26, 1929 |
| 1,802,589 | Thompson | Apr. 28, 1931 |
| 2,373,125 | Loepsinger | Apr. 10, 1945 |
| 2,421,822 | Wood | June 10, 1947 |
| 2,437,631 | Wood | Mar. 9, 1948 |